No. 764,458. PATENTED JULY 5, 1904.
I. GUYTON.
COTTON PLANTER.
APPLICATION FILED AUG. 16, 1902.
NO MODEL. 4 SHEETS—SHEET 3.
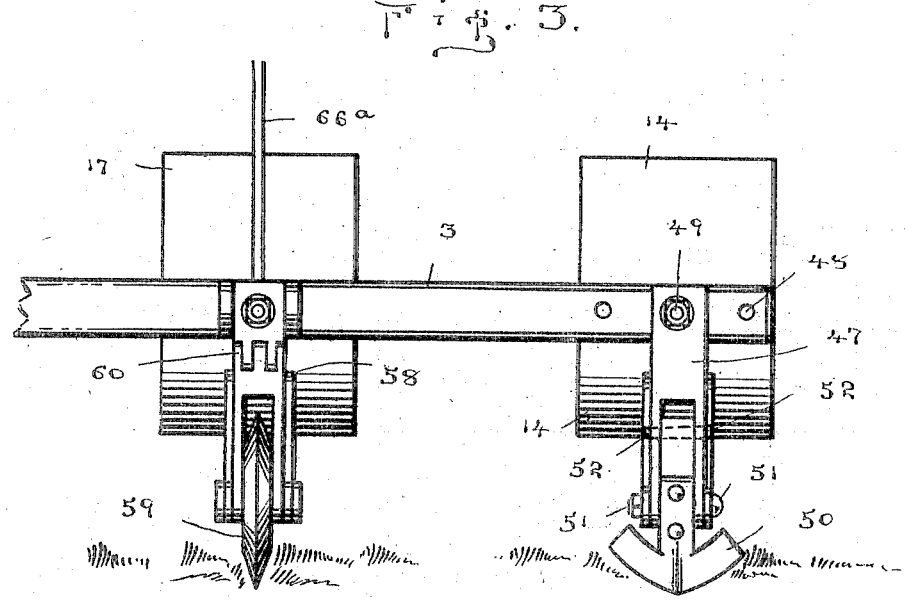
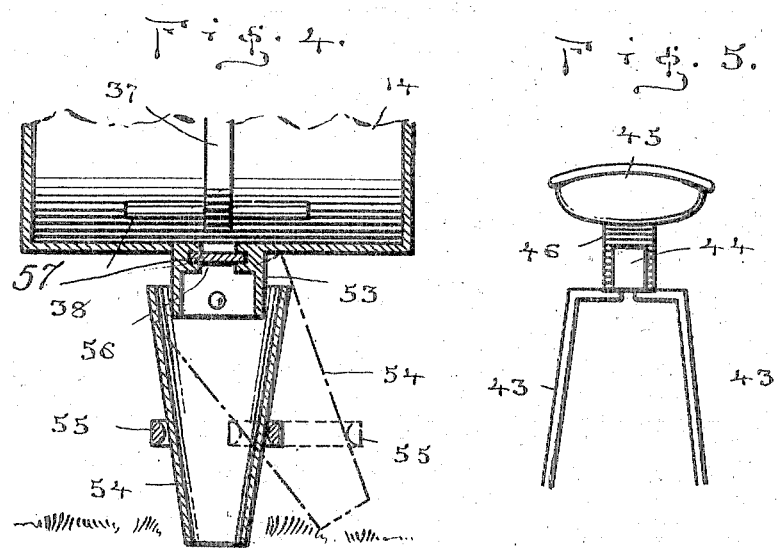
Witnesses
Inventor
Isaac Guyton,
By Victor J. Evans
Attorney

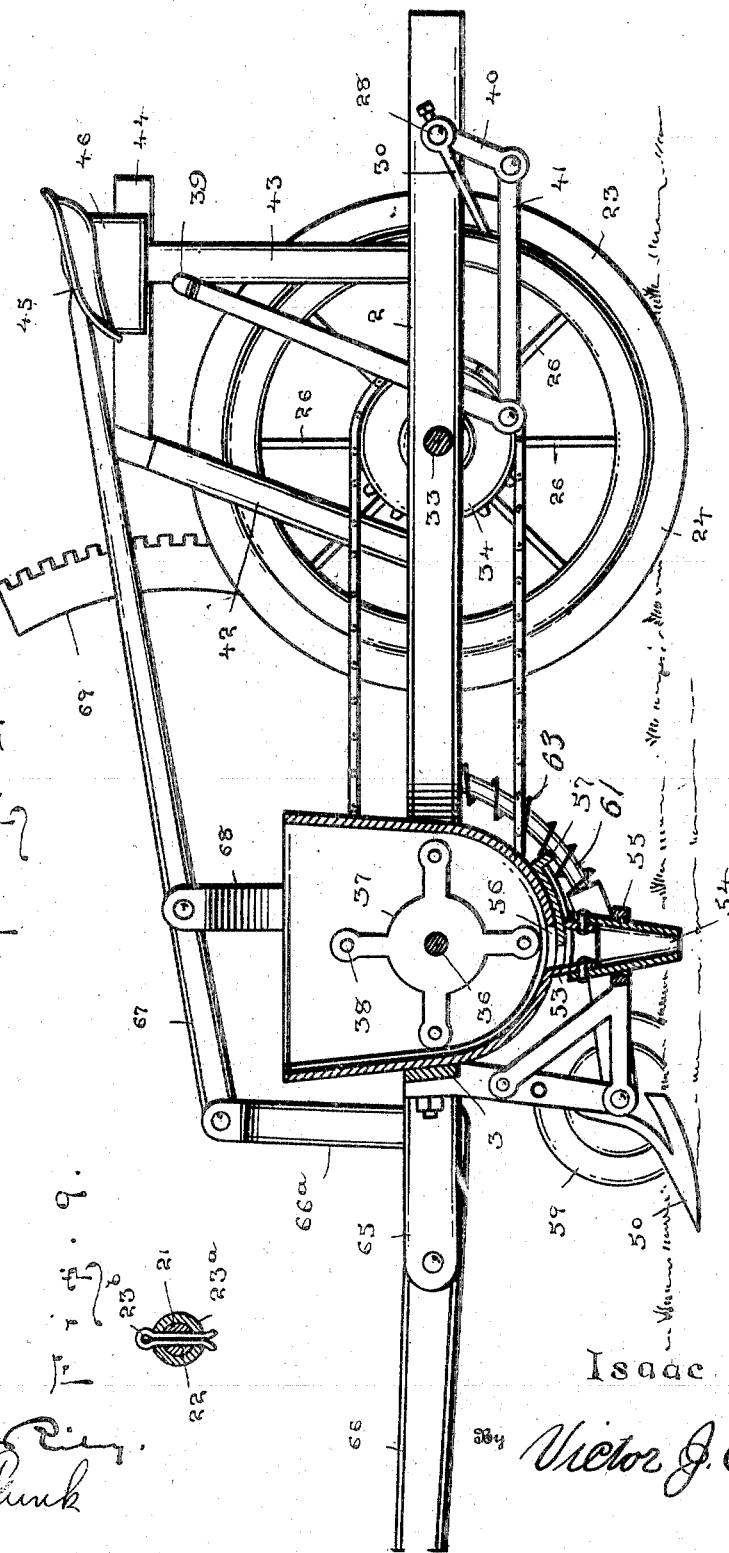

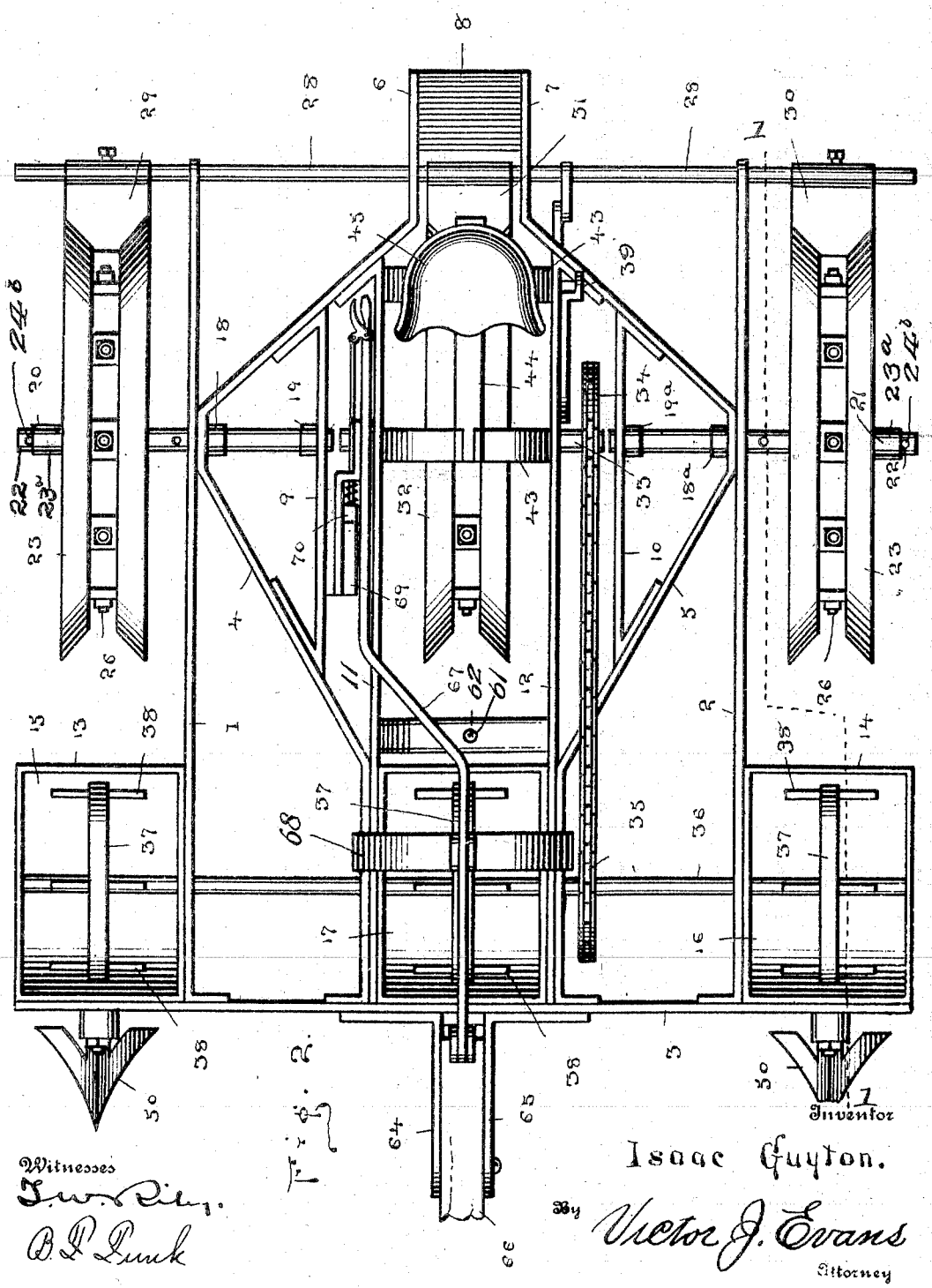

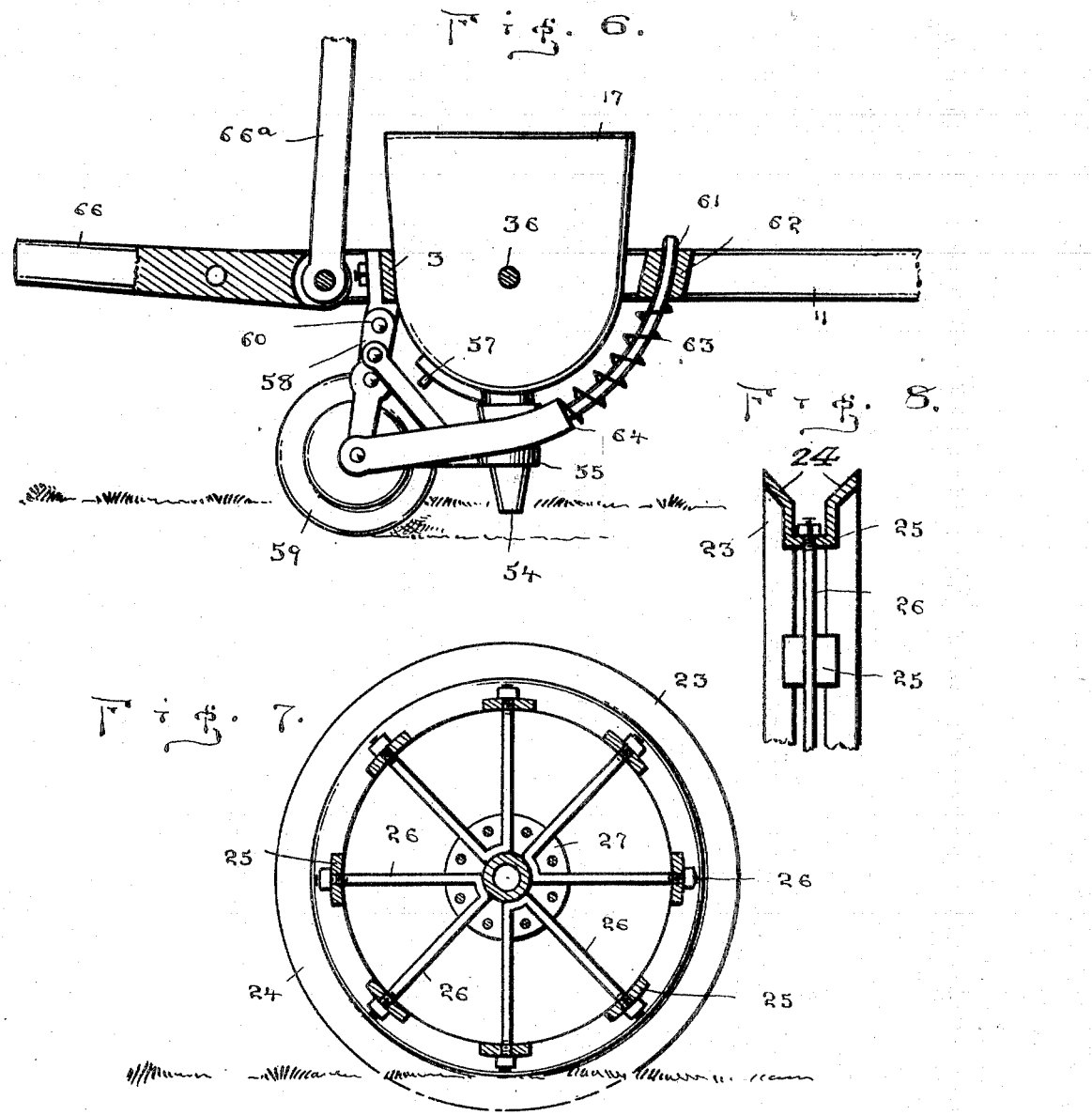

No. 764,458. Patented July 5, 1904.

UNITED STATES PATENT OFFICE.

ISAAC GUYTON, OF COLEMAN, TEXAS.

COTTON-PLANTER.

SPECIFICATION forming part of Letters Patent No. 764,458, dated July 5, 1904.

Application filed August 16, 1902. Serial No. 119,896. (No model.)

*To all whom it may concern:*

Be it known that I, ISAAC GUYTON, a citizen of the United States, residing at Coleman, in the county of Coleman and State of Texas, have invented new and useful Improvements in Cotton-Planters, of which the following is a specification.

This invention relates to cotton-planters, and has for its object to provide a planter which will be cheap, durable, and effective and provided with suitable devices for opening the furrow, drop seed therein, and cover it as the planter passes over the ground.

The invention consists in the novel arrangement and combination of parts to be referred to hereinafter and illustrated in the accompanying drawings, in which—

Figure 1 is a vertical longitudinal sectional view of a planter constructed in accordance with my invention and on the line 1 1 of Fig. 2. Fig. 2 is a top plan view of the planter. Fig. 3 is an enlarged elevation of the central seedbox, the plow-supporting wheel, and one of the end seedboxes in rear of the plow or furrow-opener. Fig. 4 is a fragmentary sectional view of one of the end hoppers and an adjustable boot secured thereto. Fig. 5 is an enlarged detail view of the seat. Fig. 6 is a side elevation of the seed-hopper, the plow-supporting wheel, and the tongue secured to the frame of the machine. Fig. 7 is an enlarged vertical longitudinal sectional view of one of the traction-wheels. Fig. 8 is a fragmentary cross-sectional view of one of the traction-wheels; and Fig. 9 is a cross-sectional view through one of the shafts, showing means for adjustably securing the traction-wheels.

A supporting-frame is provided on the machine, of which the reference-numerals 1 and 2 designate side bars resting longitudinally on the machine and parallel to each other. These bars are connected by a transverse bar 3 at their forward ends, and intermediate their ends are brace-bars 4 and 5, which are connected forwardly of the frame and run parallel with each other for a portion of their length. The bars 4 and 5 are then bent in opposite directions in diverging relation and secured to the bars 1 and 2, thence converge toward each other for a portion of their length, and finally terminating in parallel arms 6 and 7, interposed between which is a block 8, to which a suitable marker of any standard construction may be secured. In order to add additional strength and rigidity to the frame, I provide parallel brace-bars 9 and 10, the ends of which are bent back upon themselves and are arranged parallel with the converging and diverging portions of the bars 4 and 5, to which they are secured. Additional brace-bars 11 and 12 are secured to the bars 4 and 5 and assist in supporting the mechanism to be referred to hereinafter. Near the lateral extremities of the frame and supported by the bars 1 2, respectively, and the bar 3 are rectangular frames or supports 13 and 14, which carry the hoppers 15 and 16. Intermediate the ends of the bar 3 is secured a third hopper 17, which is arranged centrally of the supporting-frame, as will be explained hereinafter.

The frame of the machine has on one side thereof journal-bearings 18 and 19 and on the other side similar journal-bearings $18^a$ and $19^a$. The journal-bearings 18 and 19 are carried by the bars 1 and 4, and at the junction thereof the journal-bearing 19 is supported on the bar 9. The journal-bearing $18^a$ is supported on the bars 2 and 5, while the journal-bearing $19^a$ is supported on the bar 10. The stub-axles 20 and 21 are carried by the journal-bearings 18 and 19 and $18^a$ and $19^a$, respectively, and are provided at their free ends with transverse perforations 22, whereby suitable traction-wheels 23 may be secured thereto in adjustable relation with the frame and the hoppers through the medium of the adjustable collars $23^a$ and the pins $24^b$, passing through the collars and filling in the perforations 22. The wheels 23 each comprise flanged rings 24, the rings being arranged parallel to each other, while the flanges flare in opposite directions. The rings are connected by a plurality of equidistant transverse connecting-blocks 25, in which round-shaped spokes 26 are fastened, said spokes being secured to the hub 27.

Supported in the ends of the bars 1 and 2 is a transversely-arranged rock-shaft 28, on the respective ends of which are fastened adjustably-secured scrapers 29 and 30, while a rigid scraper 31 is secured intermediate the ends of the shafts to free the middle wheel 32 from clods, dirt, or other foreign substances. The middle wheel is supported by a transverse shaft 33, alining with the shafts 20 and 21 and secured in the bars 11 and 12. On one end of the shaft 33 is a sprocket 34, alining longitudinally with a sprocket 35, secured to a transverse shaft 36, arranged near the forward end of the machine and supported in suitable journals in the respective hoppers. This shaft runs transversely through the hoppers and supports a plurality of agitators 37, arranged within the hoppers, each of which comprises a wheel or disk near the periphery of which is a number of transversely-extending fingers 38, whereby the seeds within the hoppers will be agitated or mixed as the wheel 32 rotates. Secured to the bar 12 is a vertically-arranged pivoted lever 39, which is connected to a depending arm 40, secured to the rock-shaft 28 by a linked connection 41. By means of this lever the rock-shaft can be actuated so as to throw the scrapers into and out of contact with the periphery of the traction-wheels. Near the rear of the machine are two vertically-arranged bow-shaped standards 42 and 43, which are spaced apart and connected at their upper extremities by a longitudinally-arranged bar 44. A seat 45 is supported by the bar 44, and from the bottom of the seat projects a depending bifurcated standard 46, which straddles the bar 44, whereby the seat may be longitudinally adjusted. Carried by the bar 3 and arranged opposite the hoppers 15 and 16 are plow-standards 47, which are adjustably secured on the bar 3 to be moved toward and away from the longitudinal center of the machine by means of the perforations 48 and the bolts 49, which enter therein. The purpose of adjusting these standards laterally is to provide for the different distances the rows are to be apart, and arranged between the lower bifurcated ends of the standards 47 are plows or furrow-openers 50, which are pivoted by means of the transversely-arranged bolts 51, but normally held rigid with relation to the standards by transverse wooden pins 52, projecting through the upper extremities of the standard of the plows or furrow-openers 50 and through the sides of the standards 47. As the machine moves forward the plows will be held in proper position to open the furrows. In the event, however, that the plow strikes an obstruction, such as a root or rock, the shock will be sufficient to break the pin 52, thus permitting the plow to swing rearward on its pivot and pass over the obstruction without breaking the plow.

Projecting from the bottom of the hoppers, that are secured on the ends of the bar 3, are restricted necks or discharge-tubes 53, to which are pivoted laterally-adjustable boots 54, and each are seated in the yokes 55, carried by the standards 47. The bottom of the hoppers are provided with discharge-openings 56, normally closed by valves 57, which are slidably secured with relation to the hoppers, so that the size of the openings may be regulated according to the amount of seed to be fed. The purpose of securing the boots 54 with relation to the hopper is to provide means whereby the seed will be fed into the boots and into the furrows immediately in rear of the furrow-openers when they are adjusted to either side of the discharge-opening in the hopper.

The standard 58, which supports the plow-supporting wheel 59, journaled therein, is secured to the frame by a hinge 60, and projecting rearwardly from the standard 58 is a segmentally-curved rod 61, which projects through the transverse bar 62, interposed between the bars 11 and 12. A coil-spring 63 surrounds the rod 61, and the ends thereof bear against the bar 62 and against the shoulders 64, formed on the rod 61, whereby the plow-supporting wheel 59 will be normally held in the position shown in Figs. 1, 3, and 6. In the event, however, that the wheel passes over uncultivated ground or strikes an obstruction the resistance of the obstruction will be sufficient to push the wheel 59 rearwardly, thus projecting the rod 61 through the opening in the bar 62 and permitting the standard and wheel to swing rearwardly without affecting the relative positions of the plow. As soon as the resistance is removed from the wheel 59 the spring 63 will force it back to its normal position.

Projecting forward from the frame and supported by the bar 3 are two parallel-arranged arms 64 and 65, respectively. Between the forward extremities of these arms is pivoted the tongue 66 of the machine. A rearwardly-extending lever 67 engages the rear end of the tongue 66 by a link connection 66ª and is pivoted to a standard 68, secured to the bars 11 and 12, said lever extending rearwardly to a point adjacent the seat, where it engages a segmental rack 69 by the usual form of spring-press dog or pawl 70. The purpose of this lever and the coöperating mechanism is to enable the operator from the seat to control the relative depths of the plows or furrow-openers. This can be accomplished by grasping the lever and throwing the pawl out of engagement with the rack. Then by pressing the rearward end of the lever downward the forward end of the machine will be raised, whereby the position of the plows can be regulated when turning the machine at the end of the rows or when the machine is being transported from one field to another. By pulling up upon the lever the front of the machine will be lowered and the distance that the plows enter the ground can be effectually regulated.

Having thus described the invention, what is claimed as new is—

1. In a planter, the combination with a frame consisting of side bars, a transverse bar, brace-bars, central parallel brace-bars, and a transverse bar having a central aperture between the parallel braces; of supporting-wheels, standards depending from the frame, plows secured in the lower ends of the standards, a central depending standard hinged to the frame, a supporting-wheel journaled in the lower end of the central standard, a curved rod having a shoulder formed thereon projecting rearwardly from the central standard and passing through the aperture of the transverse bar of the parallel braces, a coiled spring surrounding the curved rod and bearing against the transverse bar and the shoulders of the rod, hoppers carried by the frame, agitators within the hoppers, and means for rotating the agitators when the wheels revolve.

2. In a planter the combination with a wheel-supported frame; of hoppers and depending standards carried thereby, a supporting-wheel journaled in one of the standards, plows pivoted in the remaining standards but held rigidly therein by breakable pins passing through the standards and upper extremities of the plows, said plow-standards being capable of transverse adjustment.

3. In a planter, the combination with a wheel-supported frame, of hoppers and plow-standards carried thereby, yokes connected to the standards and extending rearwardly, a restricted depending neck surrounding openings in the hoppers, pivoted boots secured to the hoppers and surrounding the necks of the openings and projecting through the yokes of the plow-standards, and plows secured within the lower ends of the standards.

In testimony whereof I affix my signature in presence of witnesses.

ISAAC GUYTON.

Witnesses:
J. K. BAKER,
J. W. DODD,
H. WILLIAMS.